Patented Oct. 17, 1944

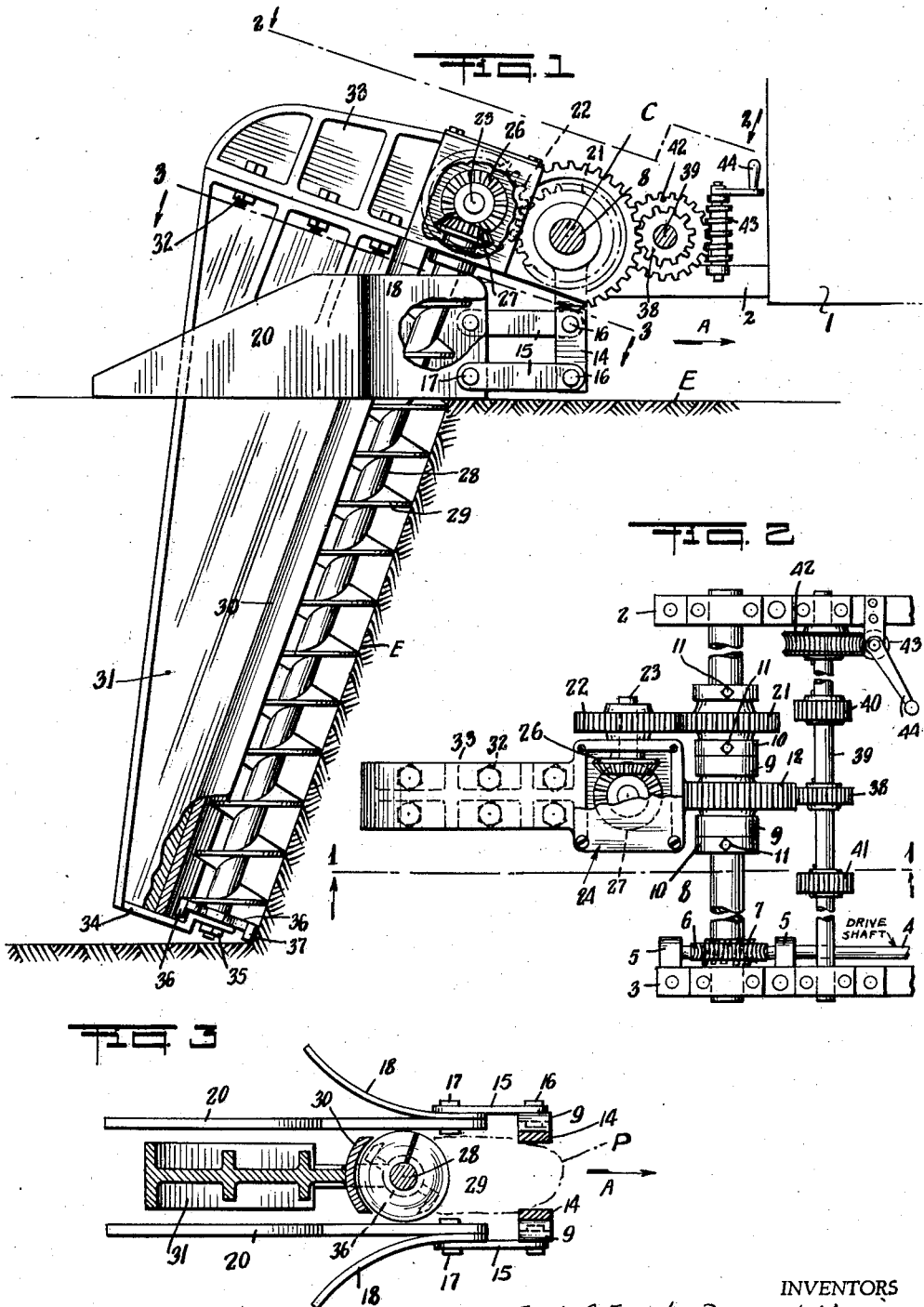

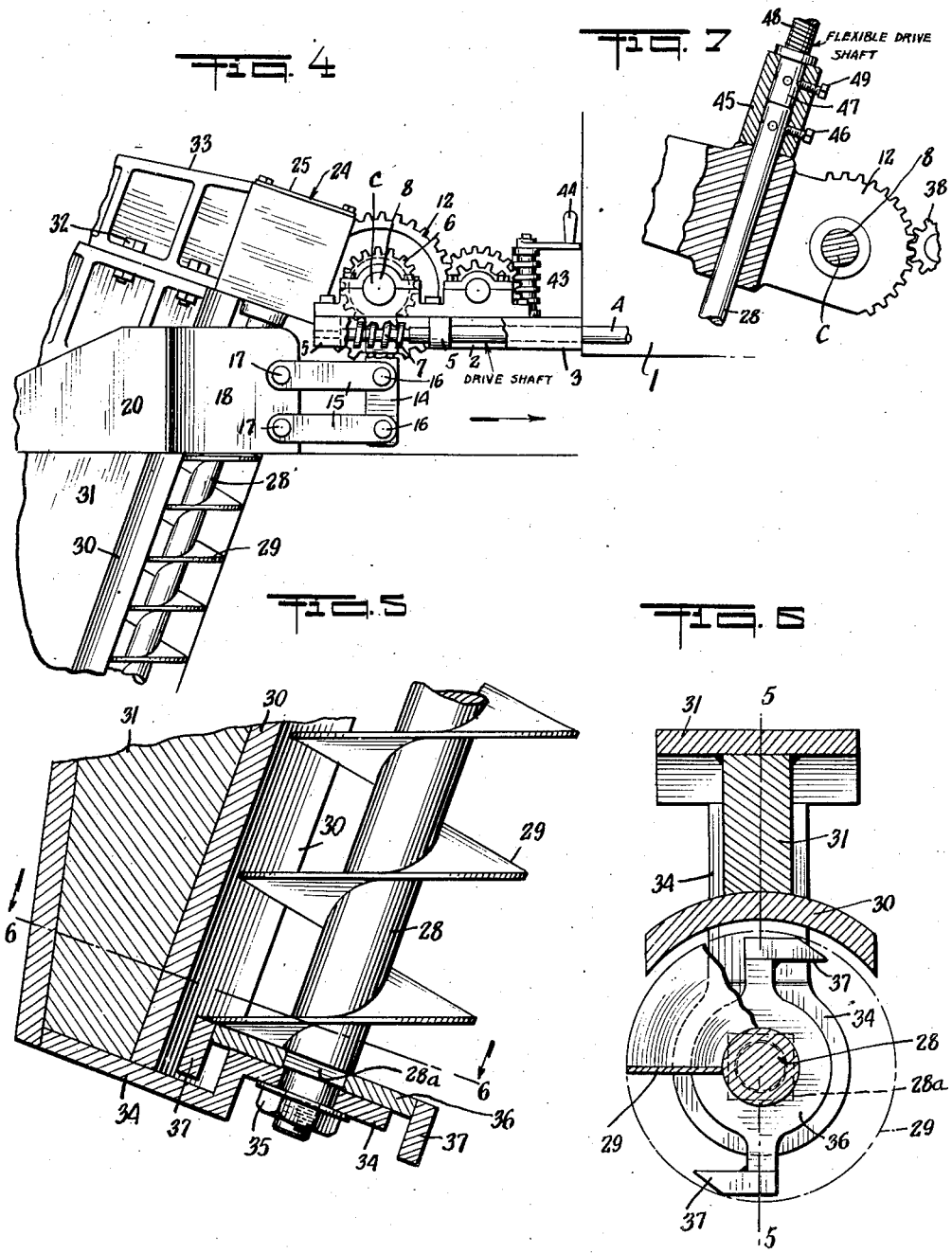

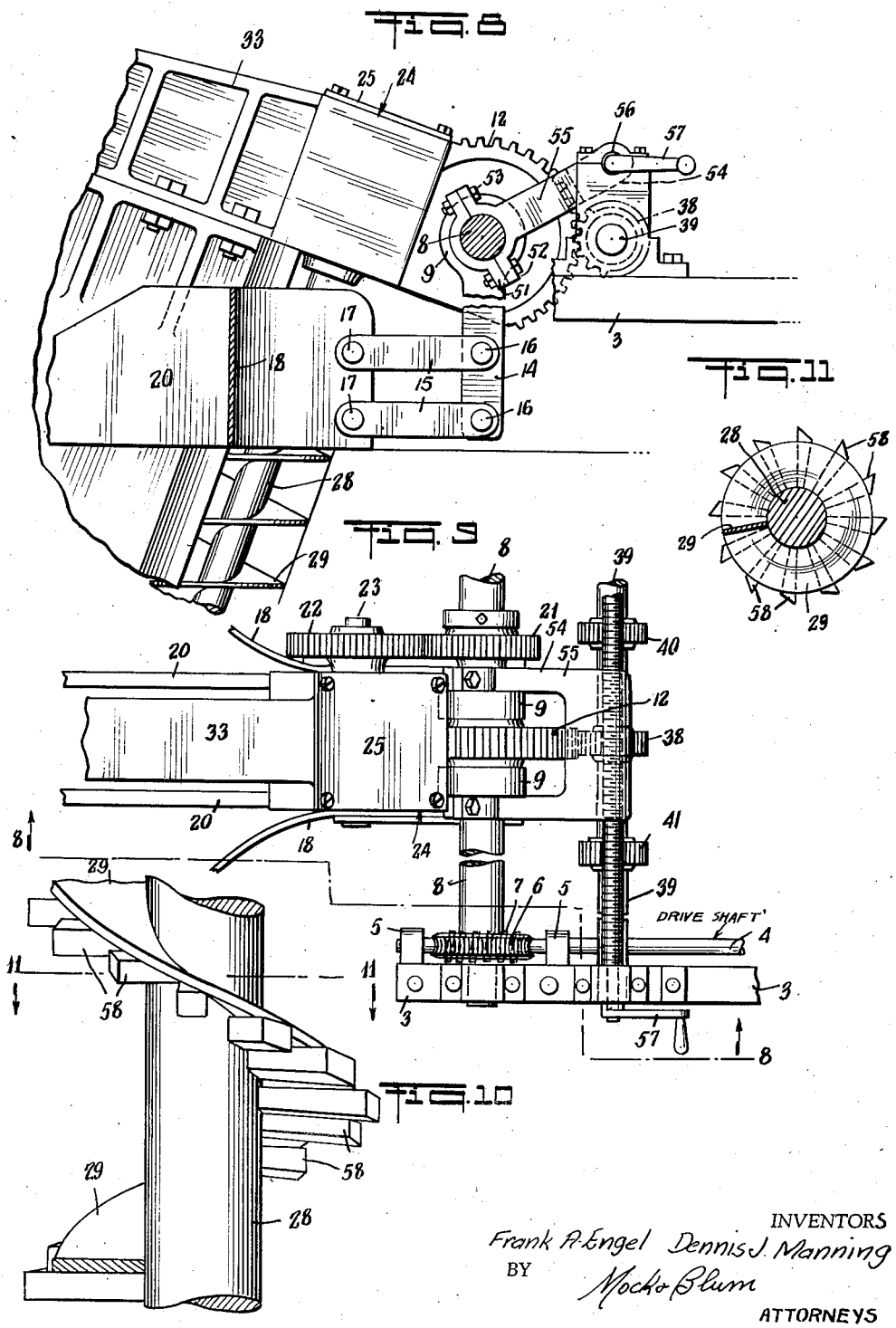

2,360,334

UNITED STATES PATENT OFFICE 2,360,334

MECHANISM FOR DIGGING TRENCHES

Frank A. Engel, Roselle, and Dennis J. Manning, Mountainside, N. J., assignors to Elizabeth Products Corporation, Elizabeth, N. J., a corporation of New Jersey Application December 3, 1941, Serial No. 421,452

5 Claims. (Cl. 37—81)

Our invention relates to a new and improved mechanism for digging trenches and the like.

One of the objects of our invention is to provide mechanism which is mounted upon a wheeled support, whereby a trench of any desired length and width and depth can be dug quickly and inexpensively.

Another object of our invention is to provide an apparatus whereby the excavated material is pushed laterally, or otherwise laterally conveyed, continuously beyond one or both longitudinal walls of the trench, while the trench is being excavated.

Another object of our invention is to provide simple and efficient mechanism for regulating the angle of the excavating tool or tools to the wheeled support, in order to regulate the depth of the trench which is being excavated.

Another object of our invention is to cut the material which is to be excavated, substantially continuously from the bottom of the trench to the top of the trench, while upwardly impelling the mass of cut material substantially throughout the entire height of said mass of cut material, while confining the cut material between the front end-wall of the trench, the parts of the longitudinal walls of the trench which are adjacent said front end-wall, and a guard or shield which is located at the rear of the mass of cut material. The cut material is thus forced upwardly above the top of the trench, or to any convenient height at which the cut material may be conveyed away from the trench, in order to prevent the cut material from falling back into the trench.

Other objects of our invention will be stated in the annexed description and drawings, which illustrate preferred embodiments thereof, it being understood that the above general statements of our invention are intended generally to explain the same, but without limiting the invention in any manner.

Fig. 1 is a vertical sectional view, partially in elevation, on the line 1—1 of Fig. 2.

Fig. 2 is a top plan view of the improved device, on the line 2—2 of Fig. 1.

Fig. 3 is a sectional view on the line 3—3 of Fig. 1.

Fig. 4 is an enlarged side elevation which shows the rear of the wheeled support, the representation of certain of the parts having been omitted in order to show other accessory parts more clearly.

Fig. 5 is a sectional view on the line 5—5 of Fig. 6.

Fig. 6 is a sectional view on the line 6—6 of Fig. 5, and it shows the lower part of the cutting and excavating tool or mechanism, and certain accessory parts, on an enlarged scale.

Fig. 7 is a detail sectional view, partially in elevation, which illustrates a modified drive for the cutting and excavating tool, said modified drive utilizing a flexible drive shaft, instead of the gear drive of the first embodiment.

Fig. 8 is an enlarged detail side elevation, illustrating a modification of the means for laterally shifting the cutting and excavating tool or mechanism.

Fig. 9 is a top plan view of Fig. 8.

Fig. 10 is a vertical elevation which illustrates a modified form of the cutting and excavating tool or mechanism.

Fig. 11 is a sectional view on the line 11—11 of Fig. 10.

While the invention is particularly useful in digging long trenches which are shallow and narrow, and in which pipe lines can be laid, said invention may be utilized for any purpose and in digging a trench of any desired width and depth.

Heretofore, in digging long trenches, it has been customary to use devices of the drag-line type, or of the type in which the excavating tools were mounted at the periphery of a rotatable wheel. In such devices, the earth was intermittently excavated by a series of digging tools of the shovel type, which delivered the excavated earth to a mechanical conveyor, which threw the earth to one side of the trench.

It has been proposed to excavate loose material, such as sand or the like, by suction means, but our invention relates particularly to digging trenches in relatively hard material, which cannot be removed and raised by suction, and which must be cut or otherwise mechanically loosened. Likewise, in using such suction device, the excavated material was confined wholly in a casing while said material was being raised, whereas we confine the material only at its rear by a shield or guard, or other mechanical device.

The mechanism is mounted upon a movable support 1, which can be of any suitable type, such as a truck or tractor. We have not illustrated the supporting wheels or supporting tracks of the movable support 1, as they are conventional. This movable support 1 is provided with a frame which has longitudinal bars 2 and 3. The drive shaft 4 is turnably mounted in suitable bearings 5, which are connected to the frame bar 3. The driven shaft 8 is provided with a worm 6, which meshes with the worm gear 7 of the drive shaft 4. The driven shaft 8 is mounted in suitable bearings in the frame bars 2 and 3. It has an axis C, as shown in Fig. 1.

Collars 9 are mounted loosely upon the driven shaft 8, so that the driven shaft 8 can turn freely relative to the collars 9. Each collar 9 is held against shifting longitudinally, in one direction, relative to the driven shaft 8, by means of an end-thrust collar 10 which is fixed to the driven shaft 8 by a clamping screw 11 or the like. The collars 9 are located at the opposite sides of segmental spur gear 12, which is also loosely mounted upon the driven shaft 8, so that the shaft 8 can turn freely relative to the segmental gear 12.

The segmental gear 12 is provided with hubs whose end-walls contact with the respective collars 9, so that the collars 9 are maintained laterally spaced from the segmental gear 12. The segmental gear 12 can turn freely relative to the collars 9, since the contact between the collars 9 and the hubs of the segmental gear 12 is substantially an anti-friction contact.

Referring to Fig. 4, each of the collars 9 has an integral depending arm or bracket 14, which is rigid with the respective collar 9. Each depending arm or bracket 14 has a pair of links 15, which are pivotally connected to the respective arm 14 at 16. Each pair of links 15 is also pivotally connected at 17 to a plough 18.

Such ploughs may be used if the trench is narrow and shallow. Any conveyor means can be used for moving the excavated material laterally away from one or both longitudinal walls of the trench.

As shown in Fig. 3, each plough 18 is laterally outwardly inclined, so that each plough 18 will deflect the excavated earth laterally away from the respective longitudinal wall of the trench.

Referring to Figs. 3 and 4, each plough 18 is associated with a retaining plate 20, which is pivotally connected by the pivot members 17, to the respective pair of links 15.

A spur gear 21 is fixed to the driven shaft 8, so that said driven shaft 8 and the spur gear 21 turn in unison. Said spur gear 21 is slidable along, but fixed against rotation relative to said shaft 8. Said shaft 8 passes through a bore of the hub of said spur gear 21, in the conventional manner. The spur gear 21 meshes with a spur gear 22, which is fixed to the jack-shaft 23. The jack-shaft 23 is provided with a suitable bearing in a casing 24. This casing 24 is provided with a removable cover 25. The jack-shaft 23 has a bevel gear 26 fixed thereto, and said bevel gear 26 meshes with a bevel gear 27.

The excavating tool and the method of use thereof, are important features of the invention, independently of the other features thereof. Said tool has a helical flight or flange 29. Each flight has a sharp cutting edge. The tool is moved forwardly by the movable support, so that the height of the tool remains constant, if the depth of the trench is uniform.

The edge of the flight cuts the material to be excavated, substantially continuously from the bottom of the trench to the top of the trench. The flight also propels the cut material upwardly, substantially continuously along the entire height of the mass of cut material. If the tool is forwardly inclined, the mass of cut material is moved in a path which has a forward longitudinal component, so that the excavated material can be piled on the ground in front of the end-wall of the trench, and the ascending cut material also exerts a forward longitudinal pressure at the rear of said pile of material. The edges of the segmental shield 30 are sufficiently close to the longitudinal walls of the trench, so that the cut material cannot pass rearwardly of said shield. The ascending cut material is therefore confined between the shield 30, the front endwall of the trench, and the respective parts of the longitudinal walls of the trench which are formed by the cutting and lifting action of the tool, in advance of the shield 30. The width of shield 30 is substantially equal to the width of the flight or flights of the auger or cutting tool, in order to prevent any rearward flow of the cut material. The assembly of the auger and the shield 30 is open at the front of said assembly, and arranged to pile the excavated material directly on the ground, ahead of the open front end of said assembly, and ahead of the front end of the trench. The deflector ploughs 18 have their front or leading edges laterally spaced from and located forwardly of the auger and shield, whereby that portion of the pile of excavated material that lies outside of the limits of the trench and ahead of said auger, will be deflected laterally by said deflector ploughs 18. The shoe-means 20 are arranged laterally relative to the auger, and said shoe-means 20 extend forwardly and rearwardly relative to the auger. The rear ends of said shoe-means 20 are located rearwardly of the ploughs 18. The shoe-means 20 are located intermediate the auger and the plough-means 18.

The segmental shield 30 is fixed to a plate 31, which is fixed by means of fastening members 32, to the extension 33 of the casing 24. The invention is not limited to the concavo-convex contour of the shield 30, because said shield 30 may have any other desired shape.

A bottom support 34 is fixed to the plate 31, by welding or the like. Said bottom support 34 is provided with a perforation. The reduced bottom end 28a of the shaft 28 extends through said perforation. Said reduced bottom end 28a is threaded. The reduced bottom end 28a is held turnably assembled with the bottom support 34, by any suitable means, such as a nut 35. This nut 35 may have a clearance relative to the supporting member 34, or else any suitable anti-friction washer or the like can be interposed between the nut 35 and the adjacent face of the bottom support 34, so that the nut 35 can turn freely relative to the bottom support 34, in unison with the shaft 28. The nut 35 can be fixed to the reduced bottom end 28a, by means of a clamping screw or the like. A bottom cutting-member 36, which is provided with cutting blades 37, is fixed to the reduced bottom end 28a of the shaft 28, in any suitable manner.

The support 1 is moved in the direction of the arrow A which is indicated in Figs. 1-3.

The tool cuts into the earth, assisted by the rotating cutters 37, and said tool raises the earth and then discharges the earth in advance of the front end of the trench which is being excavated. The earthline is indicated in Fig. 1 by the reference letter E. The excavated earth is piled up in front of the front end of the trench, in the form of a pile whose initial outline is shown approximately by the broken line P in Fig. 3.

The upwardly moving earth continuously and forwardly pushes the earth which is deposited upon the ground in advance of the front end of the trench, so that none of the earth can fall back into the trench. As the height of the pile of earth increases, said earth falls laterally in front of the ploughs 18, which push the earth laterally in respective opposite directions away from the longitudinal walls of the trench, and in front of the front end-wall of the trench, so that the earth is accumulated upon the ground at each side of the trench, and none of the earth falls back into the trench. That is, as the trench is dug according to our method, longitudinal piles of earth are formed at each side of the trench, and spaced laterally from the longitudinal walls of the trench. These longitudinal piles of earth are spaced sufficiently from the longitudinal walls of the trench, in order to prevent said longitudinal piles from falling back into the trench. These longitudinal piles of earth may be removed, or preferably they are allowed to remain for back filling, after the pipe line or other conduit has been laid.

The driving mechanism, which includes the gears 21 and 23 and the shaft 8, may be located a sufficient distance above the earth-line E, so that a pile of earth of suitable height can be formed in front of the front end of the trench, so that this pile of earth will fall laterally in front of the ploughs 18. For example, the distance between the longitudinal axis of the shaft 8 and the earth-line E may be three feet, and even more.

The angle of the longitudinal axis of the shaft 28, relative to the vertical plane, is regulated, in order to regulate the depth of the trench. As shown in Fig. 2, the segmental gear 12 meshes with a gear 38, which is detachably fixed to the shaft 39. Associated gears 40 and 41 are also detachably fixed to the shaft 39. Gear 12 is fixed to casing 24.

By loosening the clamping members 11, the gears 12 and 21 and the collars 9 and the casing 24 and the tool, can be shifted as a unit laterally along the shaft 8, so that the trench can be dug at any desired lateral distance from the frame bar 2 or the frame bar 3. When the gear 12 is thus laterally adjusted, it may mesh either with the gear 40 or with the gear 41. These gears 40 and 41 are also adjustable along their shaft 39.

The shaft 39 is provided with a worm gear 42, which meshes with a worm 43 of a shaft which is manually turned by means of the handle 44. The pitch of the worm gear 42 and of the worm 43 is such as to make the adjusting mechanism self-locking.

When the segmental gear 12 is turned, the axis of the shaft 28 of the tool is tilted so as to adjust the angle between said axis and the vertical direction. If it is desired to dig a shallow trench, the axis of the shaft 28 may be close to the horizontal position. The retaining plates 20 then function to confine the earth between the inner longitudinal surfaces of said plates 20 and the tool, so that the thrust of the tool can push the excavated earth forwardly, to be moved laterally by the ploughs 18. The earth which is thus pushed forwardly can pass laterally between the links 15, but not over the top of either plough 18.

The guard or shield 30 extends above the cutting flight 29 of the tool and above the top of the trench, so that the tool acts positively to push the earth forwardly at all times.

The shaft 39 can be turned until the lower end of the cutting and excavating mechanism is above the wheels of the wheeled support 1, so that the entire apparatus can be conveniently transported from one place to another.

In the use of the apparatus, the axis of the cutting and excavating tool may be vertical, or at any angle to the vertical. The plates 20 can be made of any desired length or height.

Fig. 7 shows a modification in which the tool shaft 28 is mounted turnably in a bearing which is integral with the partial or segmental gear 12. Suitable anti-friction bearings may be used in any part of the apparatus. An end-thrust collar 45 is fixed to the shaft 28, about its bearing, by means of a clamping screw 46. The stud end 47 of a flexible shaft 48 is fixed to said collar 45 by means of a clamping screw 49. This provides the usual drive by means of a flexible shaft, instead of utilizing the gear drive of the first embodiment.

In the embodiment of Figs. 8 and 9, the collars 10 are replaced by split collars 51 and 52 which are assembled by means of fastening members 53. The shaft 8 can turn freely relative to the assembled split collars. Each of the split collars 52 is integral with an arm 54 of the forked plate 55. This plate 55 has a tapped bore, through which the threaded shaft 56 passes. This threaded shaft 56 is mounted in suitable standards which are connected to the frame bars 2 and 3, and said threaded shaft 56 can be turned manually by means of the handle 57. This provides a better lateral adjustment of the position of the tool, in large size devices.

In the embodiment of Figs. 10 and 11, the continuous cutting flight 29 of the tool is supplemented by a series of cutters 58. The inner ends of said cutters 58 follow a helical line whose pitch is the same as that of the cutting flight 29. These cutters 58 are suitably fixed to the shaft 28, either by welding or by any suitable attaching means. As shown in Fig. 11, the outer ends of the cutters 58 project laterally beyond the cutting edge of the cutting flight 29. The purpose of these supplemental cutters 58 is to cut hard earth or stone or other material.

The links 15 permit the ploughs 18 and the retaining plates 20 to ride up and down, so as to compensate for irregularities in the earth-line.

In starting the use of the device, the shaft of the tool is tilted until it is substantially horizontal. The movable support 1 is held stationary while the tool is operated, in order to start the digging of the trench. As the trench becomes deeper at the starting end, the shaft 28 is tilted downwardly, until the initial end of the trench has been dug to the desired depth. In starting the trench according to this method, the rear end-wall of the trench may be of arcuate contour. It is desired to have the rear end-wall of the trench perpendicular, the conveyor 1 can be backed immediately after or during the starting of the trench, so as to provide a substantially vertical end-wall for the trench. The axis of the cutting and excavating tool is turned, so as to approach said axis more nearly to the vertical position, while the movable support is moved backwards.

When the trench has been dug to the desired depth, and the shaft 28 has been tilted downwardly to the final adjusted inclination, the truck or tractor 1 is moved forwardly, at a regulated speed which corresponds to the digging speed of the tool.

The tool not only excavates the earth, but it also pushes the excavated earth forwardly in front of the front end of the trench. Above the earth line E, the imperforate shield 30 and the imperforate longitudinal plates 20, form a casing which is substantially closed, save at the forward end of said casing. The drawings are wholly diagrammatic, and not to scale. Above the earth line, the edges of the shield 30 can be very close to the inner walls of plates 20, or the edge-walls of the shield can even abut or substantially abut said inner walls of the plates 20. As soon as the pile of excavated material exceeds a certain height, so that the angle of repose of said material is exceeded, said excavated material flows forwardly under the action of gravity. The height of plates 20 and of ploughs 18, preferably substantially exceeds the maximum height of the pile of excavated material, which is required to exceed said angle of repose. When the material begins to flow under the action of gravity, it cannot flow backwards, because the top end of the tool and the top end of the shield 30, above the earth line E, are above said maximum height of the pile of earth. Hence, when the excavated material flows under the action of gravity, it flows to an area which is located in front of the front ends of ploughs 18, and the thrust on the excavated material which is produced by the tool, and the force of gravity, then causes the excavated material to flow laterally outwardly in front of the front ends of the ploughs 18, that is, away from the longitudinal walls of the trench. The earth also flows laterally outwardly, in front of the arms 14, so that said lateral flow is not obstructed by links 15. The links 15 can be made very thin, and the bottom link 15 can be located sufficiently high, in order to permit the easy and substantially unobstructed outer lateral flow of the excavated material, in front of the front ends of the ploughs 18, but such material preferably flows laterally, only directly in front of the ploughs 18. The excavated material which is thus located in front of the ploughs 18, is pushed laterally outwardly by said ploughs, in longitudinal piles which are substantially parallel to the longitudinal walls of the trench, and at predetermined distances from said longitudinal walls. The mechanism preferably leaves the excavated material in such longitudinal piles, although the invention is not limited to this feature.

If the movable support 1 is moved forwardly and continuously at a proper predetermined speed, the excavated material is thus continuously moved forwardly and laterally outwardly. The ploughs 18 and even the plates 20, or either of said elements, may be omitted, if desired, although their use is preferable. The plates 20 are useful when a shallow trench is being dug with the use of a relatively long tool, whose shaft is close to the horizontal position.

The method and mechanism are operative, even when the shaft of the tool is vertical.

The shield 30 preferably extends below the bottom of the cutting and excavating device or devices.

The support 1 and the tool are preferably operated continuously and in unison, but the invention includes intermittent operation of either or both of said elements.

When we refer to progressive digging, we include continuous and intermittent operation of the support or excavating means.

The shield 30 may surround any desired part of the circumference of the tool, below or above the earth line, or both below and above the earth line. Below the earth line, said shield may surround substantially 50% of the circumference of the tool, but said shield preferably surrounds slightly less than 50% of said circumference. The width of the shield 30 may vary. It may be wider at its top-portion, adjacent the plates 20, than below said top-portion. The function of the shield is to prevent any rearward flow of the loose material which is cut out or dug out, below the earth line, as well as to prevent such rearward flow above the earth line.

By changing the direction of movement of the support 1, we can dig a trench of any desired angular or curved shape.

The invention is not limited to the use of a single cutting and excavating tool. Likewise, the invention is not limited to any particular angular relation between the longitudinal axis of the cutting and excavating tool, and the median vertical plane of the trench.

The cutting part or parts of the tool or tools may be operated at different lateral distances from a predetermined longitudinal plane, so that the trench may have any tapered cross-section.

The digging mechanism is mounted preferably at the rear end of the movable support 1, but it may be mounted on the front end of said movable support 1, if the lateral spacing of the wheels of said support 1 sufficiently exceeds the width of the trench which is being excavated.

Our invention is very valuable in digging trenches of small width, such as 10 inches or less, because existing machines are not efficient in digging trenches whose width is less than about 10 inches. Our improved machine can dig shallow trenches whose width is as low as 3 to 3½ inches or less, which is especially valuable in digging trenches for laying small pipe lines and narrow conduits.

We have described preferred embodiments of our invention, but it is clear that numerous changes and omissions can be made without departing from its spirit. Likewise, the invention includes numerous valuable sub-combinations, which can be used independently of the complete apparatus described herein.

We claim:

1. Trench-excavating mechanism comprising a movable support, a turnable auger turnably mounted in said support, said auger extending downwardly from said movable support below the ground level, a shield connected to said movable support, said shield being located behind said auger and extending above the ground level, the assembly of said shield and auger being open at the front of said assembly so that the excavated material is deposited on the ground in front of the front end of the trench in the form of a pile which can move laterally on the ground when the angle of slip of said pile is exceeded, deflecting ploughs connected to said movable support, said auger being located intermediate said deflecting ploughs, the front ends of said deflecting ploughs being located in front of that part of the auger which is at ground level, said deflecting ploughs laterally deflecting that part of the pile of excavated material that lies outside of the limits of the trench and ahead of the auger, away from the longitudinal walls of the trench.

2. Trench-excavating mechanism according to claim 1, in which said movable support has shoes connected thereto, said shoes being located at ground level, said shoes being intermediate said auger and said ploughs, said shoes having endportions which are located forwardly of said shield and the part of said auger which is at ground level, said shoes extending rearwardly of the front ends of said ploughs at least up to said shield.

3. Trench-excavating mechanism comprising a movable support which rides wholly on the ground level in front of the front end of the trench which is being dug, a supplemental support connected to said movable support, said supplemental support being tiltable around a horizontal axis relative to said movable support, a turnable auger turnably connected to said supplemental support, said auger extending downwardly and rearwardly of said movable support, a shield connected to said supplemental support, said shield being located behind the auger and extending below the ground level, the width of the auger being at least equal to the width of the shield so that the shield can extend into the trench which is dug by said auger below ground level, the assembly of said shield and said auger being open at the front of said assembly, shoes connected to said movable support, said shoes extending in front and also in rear of that part of the auger which is at ground level, said shoe-means being sufficiently close to said shield to confine the flow of material which is excavated by the auger to a flow in a forward direction, the assembly of said shoes and shield and auger being open in front of said auger at ground level so that said excavated material is piled on the ground in front of the front end of the trench, and said piled material can flow laterally when its angle of slip is exceeded, ploughs connected to said movable support and extending in front of and in rear of that part of said auger which is at ground level, said auger being located intermediate said ploughs, said shoes being located intermediate said ploughs and said auger, said ploughs deflecting such laterally flowed material further laterally away from the trench to leave the excavated material on the ground laterally of the trench and between the front end and the rear end of the trench, said auger and said shield being tiltable to regulate their angle relative to a vertical plane, independently of said shoe-means and said plough-means.

4. Trench-excavating mechanism comprising a movable support which rides on the ground, an auger which is turnably and tiltably connected to said support so that said auger can be rotated and its angle relative to a vertical plane can also be changed, a shield means located at the rear of said auger and also tiltably connected to said movable support, the assembly of said shield and auger being open at the front thereof, ploughs connected to said support and extending in front of and in rear of said auger and of said shield at ground level, said auger being located intermediate said ploughs, said ploughs being located to deflect the excavated material which is raised above ground level by the auger laterally away from the trench, said auger and said shield being tiltable independently of said ploughs.

5. Trench-excavating mechanism comprising a movable support, digging-means connected to said support and operative to excavate the earth and to move the excavated earth above ground level and to pile the earth in front of the front end of the trench until the angle of slip of said piled material is exceeded and said piled material flows under the force of gravity, said excavating mechanism being forwardly and laterally open in front of said digging-means so that said flowed material can move laterally away from the axis of the trench and in front of the trench, and deflecting plough-means connected to said movable support and located to deflect only said flowed material further laterally away from the longitudinal axis of the trench, said deflecting plough-means being offset laterally relative to said digging-means and extending forwardly of said digging means at ground level.

FRANK A. ENGEL.
DENNIS J. MANNING.